United States Patent [19]
Beale, Jr.

[11] 3,878,199
[45] Apr. 15, 1975

[54] HYDROXYALKYL DERIVATIVES OF 1,3,5-TRIAZACYCLOHEPTANE-2,4-DIONES

[75] Inventor: Alvin F. Beale, Jr., Lake Jackson, Tex.

[73] Assignee: The Dow Chemical Company, Midland, Mich.

[22] Filed: July 23, 1973

[21] Appl. No.: 381,931

[52] U.S. Cl............................ 260/239.3 R; 260/858
[51] Int. Cl............................................. C07d 55/54
[58] Field of Search ............................. 260/239.3 R

[56] References Cited
FOREIGN PATENTS OR APPLICATIONS
2,036,172   1/1972   Germany...................... 260/239.3 R OTHER PUBLICATIONS
Pachter et al., "J. Org. Chem.," Vol. 15, pages 909–917, (1950).

*Primary Examiner*—Henry R. Jiles
*Assistant Examiner*—Robert T. Bond
*Attorney, Agent, or Firm*—Benjamin G. Colley

[57] ABSTRACT

1,3,5-triazacycloheptane-2,4-dione compounds having the formula

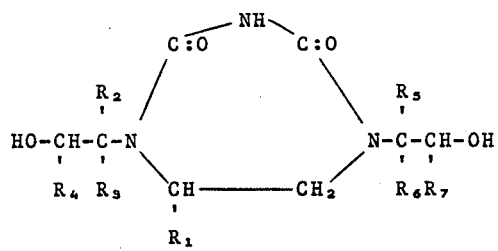

wherein $R_1$ is independently hydrogen or an alkyl group of 1–10 carbons, $R_2$ and $R_5$ are independently hydrogen or a methyl group, $R_3$ and $R_6$ are independently hydrogen or a hydroxymethyl group and $R_4$ and $R_7$ are independently hydrogen or an alkyl group of 1–7 carbons. These compounds have been found to be useful as crosslinking agents for polyurethane foams.

10 Claims, No Drawings

HYDROXYALKYL DERIVATIVES OF 1,3,5-TRIAZACYCLOHEPTANE-2,4-DIONES

BACKGROUND OF THE INVENTION:

This invention relates to hydroxyalkyl derivatives of 1,3,5-triazacycloheptane-2,4-diones and a method of making them.

6,6-Dimethyl-1-isopropyl-1,3,5-triazacycloheptane-2,4-dione is known from Packter et al, J. Organic Chem. 15:913 (1950). However, this compound does not have three active hydrogen and thus is not an effective crosslinking agent for polyurethane foams.

SUMMARY OF THE INVENTION

It now has been discovered that biuret or urea can be reacted with N,N′dihydroxy alkyl ethylene diamines to produce hydroxyalkyl of 1,3,5-triazacycloheptane-2,4-diones having the formula

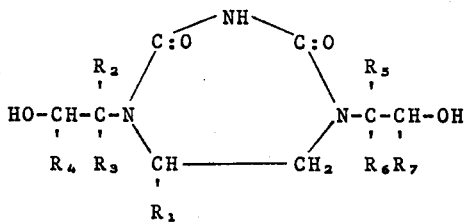

wherein $R_1$ is independently hydrogen or an alkyl group of 1–10 carbons, $R_2$ and $R_5$ are independently hydrogen or a methyl group, $R_3$ and $R_6$ are independently hydrogen or a hydroxymethyl group and $R_4$ and $R_7$ are independently hydrogen or an alkyl group of 1–7 carbons. These compounds have been found to be useful as crosslinking agents for polyurethane foams.

DETAILED DESCRIPTION

The compounds of this invention as set forth above are prepared by reacting substituted N,N′-di(2-hydroxyalkyl) ethylene diamines with biuret substantially on a mol-for-mol basis in an inert organic solvent. Urea can be substituted for biuret with the use of twice the amount of urea.

The generic formula for the substituted ethylene diamines used herein is

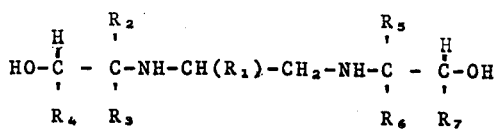

wherein $R_1$ is independently hydrogen or an alkyl group of 1–10 carbons; $R_2$ and $R_5$ are independently hydrogen or a methyl group; $R_3$ and $R_6$ are independently hydrogen or a hydroxymethyl group; $R_4$ and $R_7$ are independently hydrogen or an alkyl group of 1–7 carbons.

Specific examples of symmetric diamines are:
N,N′-di(2-hydroxyethyl)ethylene diamine
N,N′-di(2-hydroxyethyl)-1,2-propylene diamine
N,N′-di(2-hydroxyethyl)1,2-butylene diamine
N,N′-di(2-hydroxy propyl)ethylene diamine
N,N′-di(2-hydroxy butyl)ethylene diamine
N,N′-di(2-hydroxy pentyl)ethylene diamine
N,N′-di(2-hydroxy propyl)-1,2-propylene diamine
N,N′-di(2-hydroxy butyl)-1,2-butylene diamine
N,N′-di(2-hydroxy pentyl)-1,2-propylene diamine
N,N′-di(2-hydroxy propyl)-1,2-butylene diamine
N,N′-di(2-hydroxy pentyl)-1,2-butylene diamine
N,N′-di[(1-hydroxymethyl-2-hydroxy)ethyl]ethylene diamine
N,N′-di[(1-hydroxymethyl-2-hydroxy)ethyl]-1,2-propylene diamine
N,N′-di[(1-hydroxymethyl-2-hydroxy)ethyl]-1,2-butylene diamine
N,N′-di[(1-hydroxymethyl-2-hydroxy)propyl]ethylene diamine
N,N′-di[(1-hydroxymethyl-2-hydroxy)propyl]-1,2-propylene diamine
N,N′-di[(1-hydroxymethyl-2-hydroxy)propyl]-1,2-butylene diamine.

Specific examples of asymmetric diamines are:
N-2-hydroxyethyl N′-2-hydroxy propyl ethylene diamine
N-2-hydroxyethyl N′-2-hydroxy propyl 1,2-propylene diamine
N-2-hydroxyethyl N′-2-hydroxy propyl 1,2-butylene diamine
N-2-hydroxyethyl N′-2-hydroxy butyl ethylene diamine
N-2-hydroxyethyl N′-2-hydroxy butyl 1,2-propylene diamine
N-2-hydroxyethyl N′-2-hydroxy propyl 1,2-butylene diamine
N-2-hydroxyethyl N′-2-hydroxy pentyl ethylene diamine
N-2-hydroxyethyl N′-2-hydroxy pentyl 1,2-propylene diamine
N-2-hydroxyethyl N′-2-hydroxy pentyl 1,2-butylene
N-2-hydroxyethyl N′-(1-hydroxymethyl-2-hydroxy)ethyl ethylene diamine
N-2-hydroxyethyl N′-(1-hydroxymethyl-2-hydroxy)ethyl 1,2-propylene diamine
N-2-hydroxyethyl N′-(1-hydroxymethyl-2-hydroxy)ethyl 1,2-butylene diamine
N-2-hydroxyethyl N′-(1-hydroxymethyl-2-hydroxy)propyl ethylene diamine
N-2-hydroxyethyl N′-(1-hydroxymethyl-2-hydroxy)propyl 1,2-propylene diamine
N-2-hydroxyethyl N′-(1-hydroxymethyl-2-hydroxy)propyl 1,2-butylene diamine
N-2-hydroxy propyl N′-2-hydroxybutyl ethylene diamine
N-2-hydroxy propyl N′-2-hydroxybutyl 1,2-propylene diamine
N-2-hydroxy propyl N′-2-hydroxybutyl 1,2-butylene diamine
N-2-hydroxy propyl N′-2-hydroxy pentyl ethylene diamine
N-2-hydroxy propyl N′-2-hydroxy pentyl 1,2-propylene diamine
N-2-hydroxy propyl N′2-hydroxy pentyl 1,2-butylene diamine
N-2-hydroxy propyl N′(1-hydroxymethyl-2-hydroxy)ethyl ethylene diamine
N-2-hydroxy propyl N′(1-hydroxymethyl-2-hydroxy)ethyl 1,2-propylene diamine
N-2-hydroxy propyl N′(1-hydroxymethyl-2-hydroxy)ethyl 1,2-butylene
N-2-hydroxy propyl N′(1-hydroxymethyl-2-hydroxy)propyl ethylene diamine N-2-hydroxy propyl N'(1-hydroxymethyl-2-hydroxy) propyl 1,2-propylene diamine
N-2-hydroxy propyl N'(1-hydroxymethyl-2-hydroxy) propyl 1,2-butylene diamine
N-2-hydroxy butyl-N'-2-hydroxy pentyl ethylene diamine
N-2-hydroxy butyl-N'-2-hydroxy pentyl 1,2-propylene diamine
N-2-hydroxybutyl-N'-2-hydroxy pentyl 1,2-butylene diamine
N-2-hydroxy butyl-N'(1-hydroxy methyl-2-hydroxy) ethyl ethylene diamine
N-2-hydroxy butyl-N'(1-hydroxy methyl-2-hydroxy) ethyl 1,2-propylene diamine
N-2-hydroxy butyl-N'(1-hydroxy methyl-2-hydroxy) ethyl 1,2-butylene diamine
N-2-hydroxy butyl-N'(1-hydroxymethyl-2-hydroxy) propyl ethylene diamine
N-2-hydroxy butyl-N'(1-hydroxymethyl-2-hydroxy) propyl 1,2-propylene diamine
N-2-hydroxy butyl-N'(1-hydroxymethyl-2-hydroxy) propyl 1,2-butylene diamine
N-2-hydroxy pentyl-N'(1-hydroxymethyl-2-hydroxy) propyl ethylene diamine
N-2-hydroxy pentyl-N'(1-hydroxymethyl-2-hydroxy) propyl 1,2-propylene diamine
N-2-hydroxy pentyl-N'(1-hydroxymethyl-2-hydroxy) propyl 1,2-butylene diamine
N-2-hydroxy pentyl-N'(1-hydroxymethyl-2-hydroxy) ethyl ethylene diamine
N-2-hydroxy pentyl-N'(1-hydroxymethyl-2-hydroxy) ethyl 1,2-propylene diamine
N-2-hydroxy pentyl-N'(1-hydroxymethyl-2-hydroxy) ethyl 1,2-butylene diamine The foregoing compounds are either available or can be readily prepared by treating the appropriate dichloride with the desired hydroxy amine or mixtures of hydroxy amines.

While it is preferred to use a mol ratio of diamine compound to biuret of 1:1, the reaction can be conducted over the mole range from 0.5:1 to 2.0:1 diamine to biuret. With urea the preferred mol ratio is 2:1, while the mole range can be from 0.75:1 to 5:1 diamine to urea.

The temperature of the reaction should be greater than 90°C and preferably in the range of 100° to 150°C. The reaction time is not critical and can vary from about 2 hours to 12 hours.

The reaction is carried out at essentially atmospheric pressure. Higher pressures are detrimental to the product yield. Lower pressures are generally not useful since with some solvents, the reduction of the boiling point greatly lengthens the reaction time.

The foregoing diamines are mixed with the proper amount of biuret or urea and heated in an inert organic solvent. Examples of the organic solvents used herein are dimethylformamide and dimethylsulfoxide.

During the course of the reaction ammonia gas is evolved. This can be removed from the reaction zone by using a constant inert gas purge in the reaction vessel. Examples of suitable gases are nitrogen, argon, methane, ethane, propane, or mixtures thereof. If desired, the inert gas purge can be replaced by the use of lower pressure on the reactor. However, this is effective only with high boiling solvents.

The reaction is continued until significantly more than one mol of ammonia is liberated as determined by acid titration of the off gas. It is preferred to continue the reaction until 1.8 or more moles of ammonia are generated.

After the reaction is completed the reaction mixture is allowed to cool and the solvent removed by vacuum distillation.

The invention is further illustrated by the follownon-limiting examples.

EXAMPLE 1

Into a reaction flask equipped with a nitrogen sparge, stirrer and reflux condenser was placed 0.33 moles of biuret, 0.33 moles of N,N'-di(2-hydroxy ethyl)ethylene diamine and 200 of dimethyl formamide as a solvent.

The mixture was stirred and heated for 4 hours at 130°C. The evolved ammonia gas was removed by the nitrogen sparge and exhausted through a scrubber containing 7.6 N sulfuric acid. The evolved ammonia gas neutralized 70 ml of the sulfuric acid.

After the reaction flask cooled down, the solvent was distilled off under vacuum distillation. The residue remaining in the flask was dissolved in hot (65°C) ethanol. After crystallization took place, 68 grams of 1,5-di(2-hydroxyethyl)-1,3,5-triazacycloheptane-2,4-dione was recovered. This represents a yield of 95 percent. The structure of the compound was confirmed by infrared and nuclear magnetic resonance.

EXAMPLE 2

Following the procedures of Example 1, 0.194 moles of biuret were reacted with 0.194 moles of N,N'-di(2-hydroxy ethyl)ethylene diamine in 200 ml. of dimethyl sulfoxide. The reaction was conducted at 130°C for 6 ½ hours to recover 41.1 grams (99.7 percent yield) of the same product.

EXAMPLE 3

Using the same procedure as Example 2, 0.0932 moles of biuret and 0.0948 moles of N,N'-di(2-hydroxy-propyl)ethylene diamine were reacted in 200 ml of dimethylformamide as in Example 1 for one hour at 130°C and 5 hours at 140°C.

The evolved ammonia gas neutralized 22 ml of 7.6 N sulfuric acid in the scrubber. After distilling off the excess dimethylformamide, the residue was dissolved in hot ethanol and the product crystallized out. By infrared, the product was identified as 1,5-di(2-hydroxy propyl)-1,3,5-triazacycloheptane-2,4-dione.

EXAMPLE 4

Following the procedure of Example 1, 0.55 moles of N,N'-di(2-hydroxypropyl)ethylene diamine and 1.09 moles of urea were reacted in 300 ml of dimethyl formamide for 2 hours at 130°C and 2 ½ hours at 144°C.

The evolved ammonia gas neutralized 190 ml of 7.46 N sulfuric acid. After removal of solvent and crystallization, 140 gms. were recovered which was estimated to be 90 percent, 1,5-di(2-hydroxypropyl)-1,3,5-triazacycloheptane-2,4-dione.

EXAMPLE 5

Following the procedure of Example 1, 0.081 moles of N-2-hydroxyethyl-N'-2-hydroxypropyl ethylene diamine were heated with 0.080 moles of biuret in 70 ml of dimethylformamide for 1 ½ hours at 130°C and 1 ½ hours at 139°C.

After working up, 4.55 grams or 0.0196 moles of product were recovered. This product was 1-(2-hydroxyethyl)-5-(2-hydroxypropyl)-1,3,5-triazacycloheptane-2,4-dione. The structure was confirmed by infrared and nuclear magnetic resonance.

EXAMPLE 6

Preparation of high resiliency flexible urethane foam with 1,5-dihydroxyethyl-1,3,5-triazacycloheptane-2,4-dione.

A molded high resiliency flexible foam was prepared on an automatic laboratory 3-cycle foam machine by the following procedure: To 700 g. of Voranol CP 4701 (a polyether triol endcapped with ethylene oxide) was added 35 g. of a 50 percent suspension of the above compound in water, 5.6 g. of DABCO-33 LV (33 percent triethylene diamine in dipropylene glycol), 0.7 g. of NIAX-A1 [bis(2-dimethylaminoethyl)ether], and 2.1 g. of a 10 percent solution of DCF-11630 (a dimethylpolysiloxane in dioctyl phthalate). This mixture was stirred on the foam machine for 30 seconds. To this mixture was added 235.9 g. of LD-3020 (an undistilled isocyanate). This was stirred for 3 seconds, and the contents was poured into a 15 × 15 × 4 ½inch aluminum mold and allowed to foam. Foam properties were obtained from this molded foam. The foam had a tensile strength of 23.0 psi, a resiliency of 60 percent and a modulus of 2.68.

Similar good foam properties are obtained by using the other compounds of this invention.

I claim:

1. A 1,3,5-triazacycloheptane-2,4-dione compound having the formula:

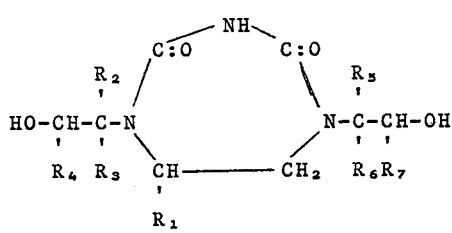

wherein $R_1$ is independently hydrogen or an alkyl group of 1-10 carbons, $R_2$ and $R_5$ are independently hydrogen or a methyl group, $R_3$ and $R_6$ are independently hydrogen or a hydroxymethyl group and $R_4$ and $R_7$ are independently hydrogen, or an alkyl group of 1-7 carbons.

2. 1,5-Di(2-hydroxyethyl)-1,3,5-triazacycloheptane-2,4-dione.

3. 1,5-Di(2-hydroxypropyl)-1,3,5-triazacycloheptane-2,4-dione.

4. 1-(2-Hydroxyethyl)-5-(2-hydroxypropyl)-1,3,5-triazacycloheptane-2,4-dione.

5. A method for the preparation of compounds having the formula

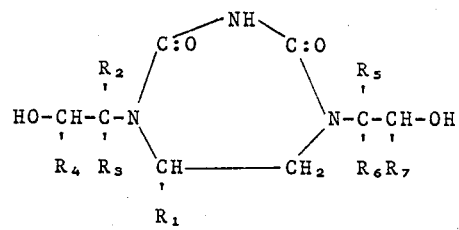

wherein $R_1$ is independently hydrogen or an alkyl group of 1-10 carbons, $R_2$ and $R_5$ are independently hydrogen or a methyl group, $R_3$ and $R_6$ are independently hydrogen or a hydroxymethyl group and $R_4$ and $R_7$ are independently hydrogen, or an alkyl group of 1-7 carbons, which comprises reacting N,N'-substituted di(2-hydroxyalkyl)ethylene diamines with biuret or urea in an inert organic solvent at a temperature greater than 90°C and recovering the product.

6. The method of claim 5 wherein the inert organic solvent is dimethylformamide or dimethylsulfoxide.

7. The method of claim 5 wherein the substituted ethylene diamines have the formula

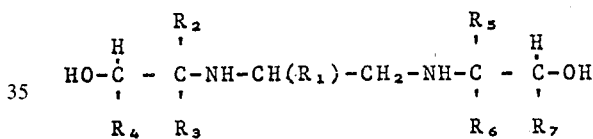

wherein $R_1$ is independently hydrogen or an alkyl group of 1-10 carbons; $R_2$ and $R_5$ are independently hydrogen or a methyl group; $R_3$ and $R_6$ are independently hydrogen or a hydroxymethyl group; $R_4$ and $R_7$ are independently hydrogen or an alkyl group of 1-7 carbons.

8. The method of claim 7 wherein the substituted ethylene diamine used is N,N'-di(2-hydroxyethyl)ethylene diamine.

9. The method of claim 7 wherein the substituted ethylene diamine used is N,N'-di(2-hydroxypropyl)ethylene diamine.

10. The method of claim 7 wherein the substituted ethylene diamine used is N-2-hydroxyethyl-N'-2-hydroxypropyl ethylene diamine.

* * * * *